United States Patent [19]

Hattori

[11] Patent Number: 5,111,385
[45] Date of Patent: May 5, 1992

[54] PARALLEL-MODE DATA TRANSFER APPARATUS USING SECTOR MEMORIES

[75] Inventor: Naoharu Hattori, Tokyo, Japan
[73] Assignee: NEC Corporation, Tokyo, Japan
[21] Appl. No.: 709,788
[22] Filed: Jun. 3, 1991

Related U.S. Application Data

[63] Continuation of Ser. No. 423,639, Oct. 19, 1989, abandoned, which is a continuation of Ser. No. 113,510, Oct. 28, 1987, abandoned.

[30] Foreign Application Priority Data

Oct. 30, 1986 [JP] Japan ................... 61-259152

[51] Int. Cl.⁵ .............................................. G06F 3/00
[52] U.S. Cl. ..................... 395/425; 364/239; 364/239.51; 364/DIG. 1; 364/DIG. 2; 395/800
[58] Field of Search ... 364/200 MS File, 900 MS File

[56] References Cited

U.S. PATENT DOCUMENTS

| | | | |
|---|---|---|---|
| 3,772,657 | 11/1973 | Marsalka et al. | 364/200 |
| 4,032,898 | 6/1977 | Grigoletti | 364/200 |
| 4,298,954 | 11/1981 | Bigelow et al. | 364/900 |
| 4,303,988 | 12/1981 | Tsuboka et al. | 364/900 |
| 4,333,143 | 6/1982 | Calder | 364/200 |
| 4,442,485 | 4/1984 | Ota et al. | 364/200 |
| 4,667,286 | 5/1987 | Young et al. | 364/200 |

OTHER PUBLICATIONS

Hayes, J. P., "Computer Architecture and Organization", McGraw-Hill Book Company, pp. 149-151, 1978.

Anthony Ralston, "Encyclopedia of Computer Science", Van Nostrand Reinhold Co., pp. 547 and 548, 1976.

Mano, M. Morris, "Computer Logic Design", Prentice-Hall, Inc., Englewood Cliffs, N.J., pp. 18 and 19, 1972.

Considine, D. M., P. E. et al., "Van Nostrand's Scientific Encyclopedia Sixth Edition", Van Nostrand Reinhold Company, pp. 1064-1065, 1983.

Primary Examiner—Gary V. Harkcom
Assistant Examiner—Michael A. Jaffe
Attorney, Agent, or Firm—Foley & Lardner

[57] ABSTRACT

A data transfer apparatus comprises first and second memories each having a plurality of sectors each having the storage capacity of each sector in a storage disk. First and second memory access circuits are respectively associated with the first and second memories for successively specifying sectors of the associated one of the memories, writing data from the disk into the specified sectors and reading a copy of data from the associated one of the memories onto the system bus. A read-/write control circuit controls the first and second memories to alternately operate in read and write modes when data is transferred between the disk and a system bus and causes one of the first and second memories to operate in a read mode when an error is detected in the transferred data.

1 Claim, 3 Drawing Sheets

PARALLEL-MODE DATA TRANSFER APPARATUS USING SECTOR MEMORIES

This application is a continuation of application Ser. No. 07/423,639, filed Oct. 19, 1989, now abandoned, which was a continuation of application 07/113,510, filed Oct. 28, 1987, now abandoned.

BACKGROUND OF THE INVENTION

The present invention relates to a data transfer apparatus for transferring data between a sectored storage medium and a system bus.

According to a serial data transfer scheme, a buffer of large memory capacity is used for temporary storage of multi-sector data transferred between a disk and a system bus to absorb transfer speed differences between them due to asynchronous operation. One shortcoming of this serial data transfer scheme is that it is impossible to reinitiate data transfer to the disk before data transfer to the system bus has been completed, and vice versa. Therefore, the time taken to complete a data transfer in response to a given instruction is the total of the serial data transfer operations, resulting in a substantial amount of time for executing a data transfer operation. Furthermore, since the best performance of a serial data transfer system is determined by the memory capacity of the buffer, it is impossible for the serial data transfer scheme to attain a higher efficiency. A further disadvantage is that it requires complex circuitry.

In another prior art system where first-in-first-out memories are used to permit parallel transfer operations, no data is retained in the memories after data transfer is completed. Therefore, if an error is detected in the transferred data, there is no way of knowing where the error has occurred, making it difficult to diagnose circuitry.

SUMMARY OF THE INVENTION

Accordingly, it is an object of the present invention to provide a data transfer apparatus which permits reduction of data transfer time and allows retention of data for circuit analysis for error detection purposes.

This object is obtained by operating two sector memories in write and read modes respectively in a first half of a data transfer operation and operating them in read and write modes in a second half of the data transfer operation and reading a copy of data from a specified sector of the memories when an error is detected in data read out of the memories.

The data transfer apparatus of the present invention comprises first and second memories each being partitioned into a plurality of sectors corresponding to the sectors of a storage medium. A first counter periodically increments a first address count beginning with a count value preset by a data processor and generates a first carry output when the first address count reaches a prescribed count value, the first address count specifying a memory cell in each of the sectors of the first memory. A second counter is responsive to an input pulse applied thereto for incrementing a second address count beginning with a count value preset by the data processor, the second address count specifying each one of the sectors of the first memory. A first flag is set in response to the first occurrence of the carry output and is reset in response to the second occurrence of the first carry output. A first gate is responsive to the first flab being set for applying the second occurrence of the first carry output to the second counter as said input pulse.

A third counter is provided for periodically incrementing a third address count beginning with a count value preset by the data processor and generating a second carry output when the second address count reaches a prescribed count value, the third address count specifying a memory cell in each of the sectors of the second memory. A second flag is set in response to the first occurrence of the second carry output and is reset in response to the second occurrence of the carry output. A fourth counter is responsive to an input pulse applied thereto for incrementing a fourth address count beginning with a count value preset by the data processor, the fourth address count specifying each one of the sectors of the second memory. A second gate is responsive to the second flag being set for applying the second occurrence of the second carry output to the fourth counter as its input pulse. A read/write controller is responsive to outputs of the first and second flags for controlling the first and second memories to alternately operate in read and write modes so as to cause data to be written either from the storage medium or the system bus into a specified sector of the first memory and to subsequently cause a copy of data to be read from the specified sector of the first memory either into the system bus or the storage medium, and to further cause data either from the storage medium or the system bus to be written into a specified sector of the second memory simultaneously with the reading of data from the first memory and to subsequently cause a copy of data to be read from the specified sector of the second memory either into the system bus or the storage medium simultaneously with the writing of data into the first memory. The read/write controller further operates the first and second memories is read mode when an error is detected by the process for reading a copy of data from one or more sectors of either of the first and second memories.

BRIEF DESCRIPTION OF THE DRAWINGS

The present invention will be described in further detail with reference to the accompanying drawings, in which.

DETAILED DESCRIPTION

Figure 1:
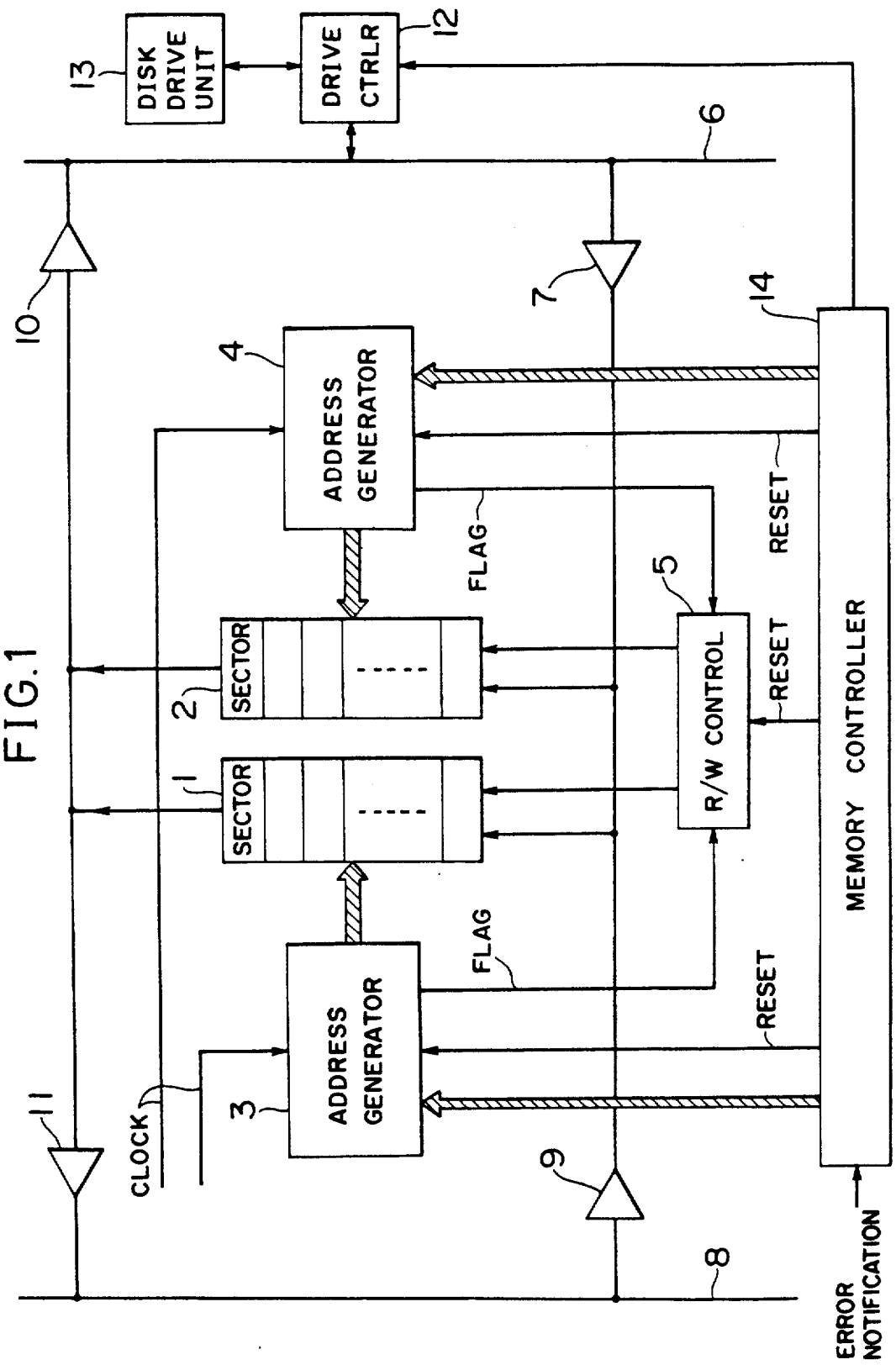
FIG. 1 is a block diagram of a data transfer apparatus of the invention.

Referring now to FIG. 1, there is shown a data transfer control system for disk drives according to an embodiment of the present invention. The system comprises a first memory 1 and a second memory 2. Each of the memories 1 and 2, is partitioned into a plurality of sectors corresponding to a sectored sector of a magnetic storage medium, such as floppy disk. Each sector of memory 1 contains memory cells which are addressable as a function of a lower-bit address count supplied from an address generator 3, the lower-bit address count being incremented in response to a clock pulse. On the other hand, each sector of memory 1 is identified by a higher-bit address count from the address generator 3. Likewise, each sector of memory 2 contains memory cells which are addressable as a function of a lower-bit address count supplied from an address generator 4, the lower-bit address count being incremented in response to a clock pulse. Each sector of memory 2 is identified by a higher-bit address count from the address generator 4. The higher-bit address of each address generator is incremented in response to a carry output generated in a manner as will be described.

Read/write control signals for memories 1 and 2 are supplied from a read/write control circuit, or flip-flop 5 for writing data supplied either from an internal bus 6 through a three-state buffer 7 or from a system bus 8 through a three-state buffer 9 and for reading the stored data out of the memories either onto the internal bus 6 through a three-state buffer 10 or onto the system bus 8 through a three-state buffer 11. A disk-drive controller 12 is connected between the internal bus 6 and a disk drive 13 to control data transfer between them.

Address generators 3 and 4 have program inputs which are supplied from a memory controller 14. During normal data transfer operation, the program inputs are preset to a zero address count. The address generators 3 and 4 initiate incrementing their address counts from the preset values. On the other hand, if there is an error in a data block transferred from a given sector of the disk, the program inputs are set equal to a count value corresponding to the starting point of the suspect area of the given sector to cause the address counts to be incremented from the starting point of the suspect area.

Figure 2:
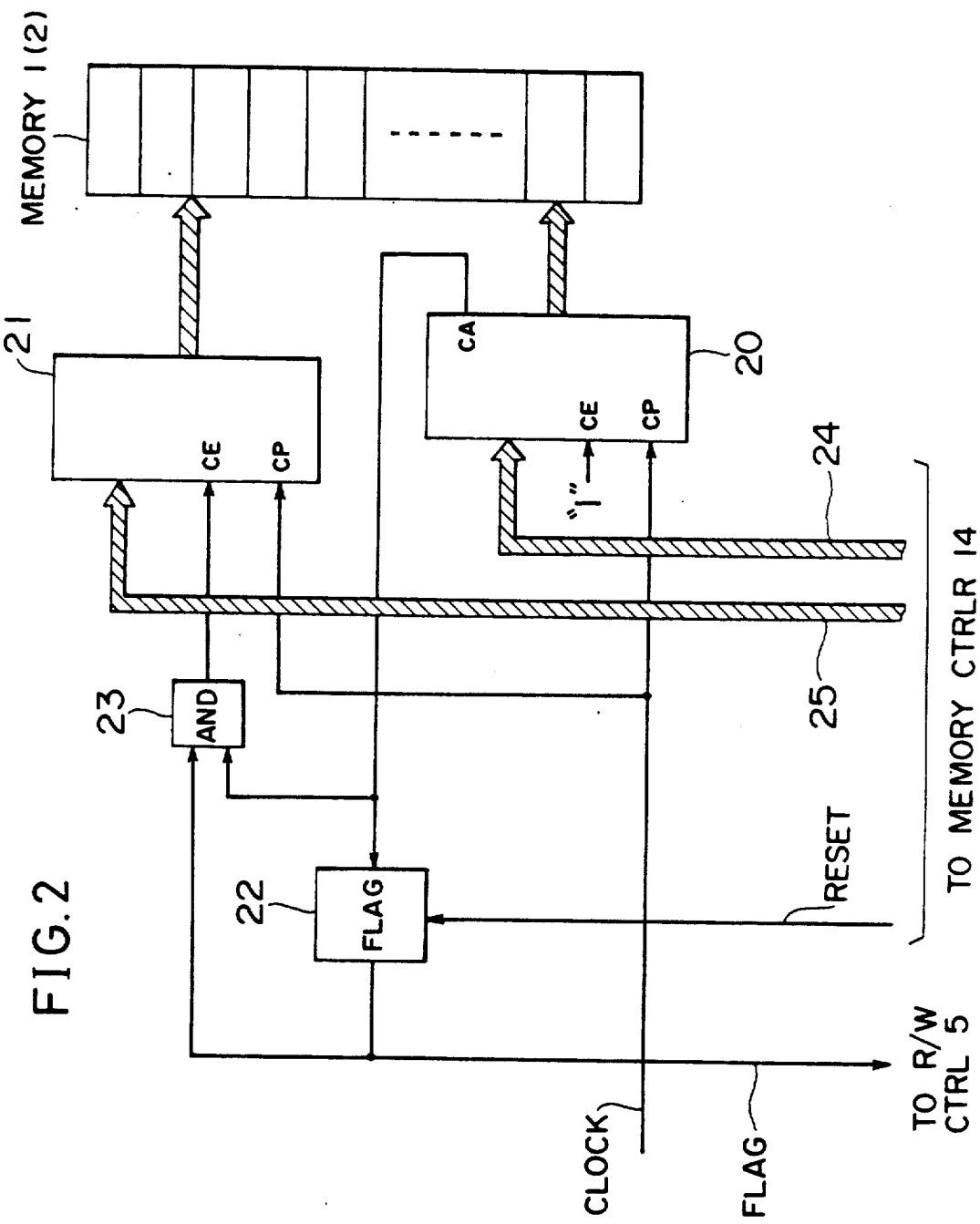
FIG. 2 is a circuit diagram of each of the memory access circuits, or address generators, of FIG. 1.

As illustrated in FIG. 2, each of the address generators 3 and 4 comprises a lower-bit address counter 20, a higher-bit address counter 21, a flag 22 and an AND gate 23. Lower-bit counter 20 is preset with a lower-bit word supplied on bus 24 from the memory controller 14 and higher-bit counter 21 is preset with a higher-bit word supplied on bus 25 from the controller 14. Lower-bit counter 20 is always enabled to count clock pulses to generate a lower-bit address with which all the memory cells of a sector can be accessed. A carry pulse is generated by the lower-bit counter 20 when the maximum count is reached corresponding to the ending point of the sector and supplied to the flag 22 and to one input of the AND gate 23. Flag 22 is set equal to ONE in response to the trailing edge of the carry pulse to enable the AND gate 23, so that it produces a ONE output in response to the next carry pulse. The output of AND gate 23 is applied to the count enable input of higher-bit counter 21 to cause it to generate a higher-bit address which specifies one of the sectors of the associated memory. The output of flag 22 is also applied to the read/write control circuit 5 to change the read/write modes of memories 1 and 2.

Figure 3:
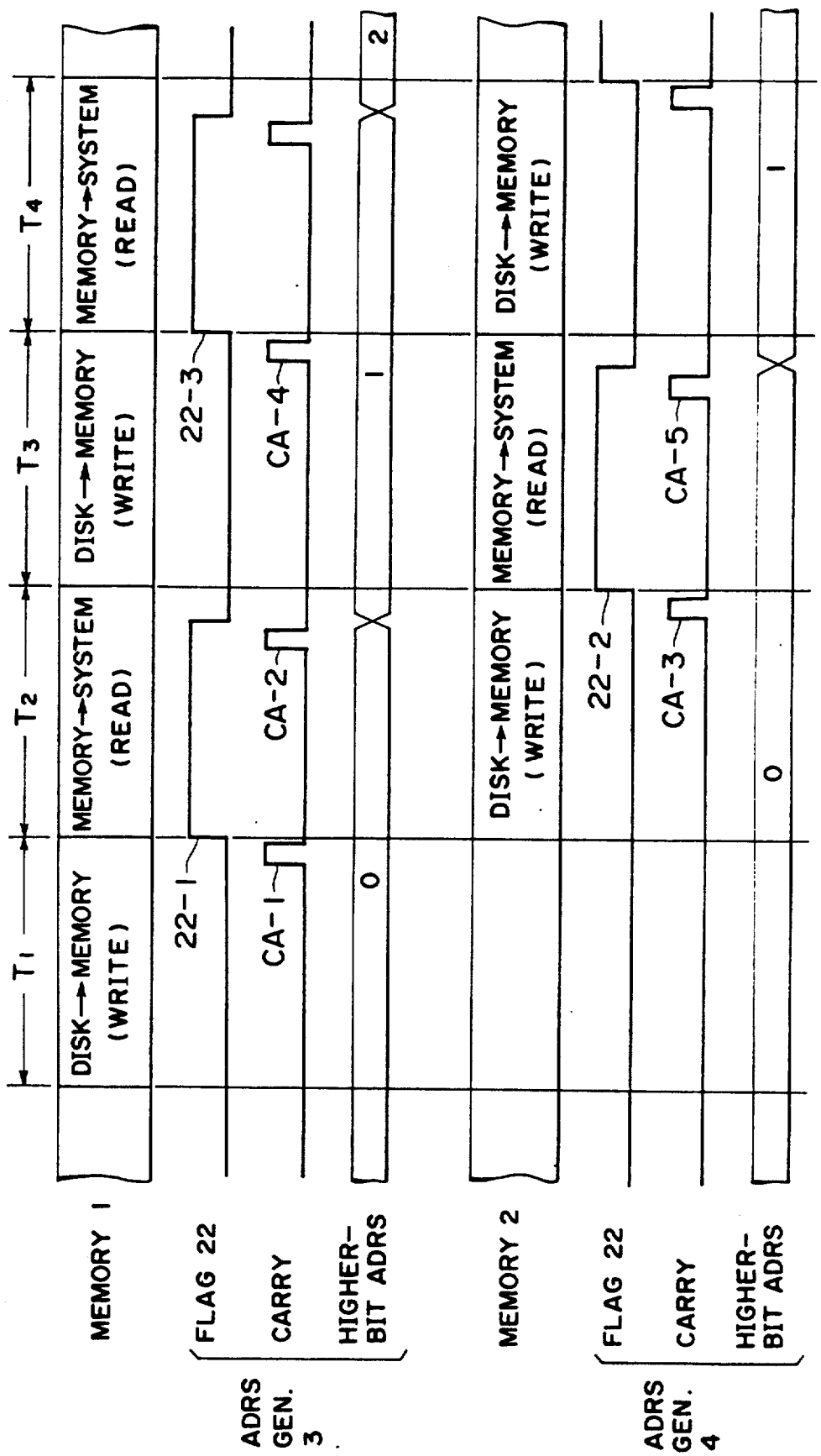
FIG. 3 is a timing diagram useful for an understanding of the present invention.

The operation of the data transfer control system of the invention will be best understood by the following description with reference to FIG. 3. For purposes of disclosure, the description is concerned only with the system when performing data transfer from a disk to the system bus 8 since the operation involved with system-to-disk data transfer is similar to the disk-to-system data transfer.

Assume that lower-bit counters 20 of each address generator are initially preset to a zero count by the memory controller 14 corresponding to the starting point of a given sector of a storage disk and the higher-bit counters 21 of each address generator are preset to zero counts both specifying the first sector areas of memories 1 and 2, respectively. Flags 22 of each address generator and the read/write flip-flop 5 are initialized by the memory controller 14, so that the flags are both set equal to ZERO and the memories, 1 and 2 are respectively set to operate in write and read modes. Disk-drive controller 12 is then enabled to read a copy of data from the disk drive 13 and forwarded it onto the internal bus 6. The data read out of the first sector of the disk is applied to the data input of memory 1 and the first sector area of memory 1 is specified by the higher-bit address from the address generator 3. Lower-bit counter 20 increments its count in response to clock pulse to write the input data sequentially into the memory cells of the first sector area of memory 1. When all the data contained in the first sector of the disk are transferred to the first sector area of memory 1 during time interval $T_1$, a carry pulse CA-1 is generated by the lower-bit counter 20 of address generator 3 and the flag 22 is set equal to ONE, as shown at 22-1, immediately following the trailing edge of the carry pulse CA-1.

In response to the flag 22-1, AND gate 23 is enabled and read/write control circuit 5 changes the operating modes of memories 1 and 2 so that during time interval $T_2$ memory 1 operates in read mode and memory 2 operates, in write, mode. A copy of data stored in of memory 1 is read out the first sector area onto the system bus 8 in response to lower-bit address count which is incremented by the counter 20 of address generator 3 in the same manner as it is incremented during the write mode. A carry pulse CA-2 will then be generated when the access point reaches the end of the first sector area of memory 1 to switch the flag 22 to ZERO. Since the AND gate 23 is enabled, the carry pulse CA-2 is also applied to the count enable input of the higher-bit counter 21 to admit a single clock pulse to the clock input CP to thereby increment the higher-bit address count to ONE.

Meanwhile, drive controller 12 is reading a copy of data from the second sector of disk and memory 2 is accessed by address generator 4 to write it into the first sector area of memory 2. When the access point reaches the end of the first sector area of memory 2, a carry pulse CA-3 is generated by the lower-bit counter 20 of address generator 4, causing the flag 22 of address generator 4 to switch to ONE, as shown at 22-2, to change the operating modes of memories 1 and 2 and enable the AND gate 23 of address generator 4.

Therefore, during time interval $T_3$, memories 1 and 2 operate in write and read modes, respectively, and controller 12 now accesses the third sector of disk. Since the higher-bit counter 21 is incremented to ONE, the second sector area of memory 1 is specified to write data from the third sector of disk into the second sector area of memory 1 in response to the lower-bit address count. When the end of the second sector area of memory 1 is reached, a carry pulse CA-4 is generated, causing the flag 22 of address generator 3 to switch to ONE, as shown at 22-3, to change the operating modes of memories 1 and 2. Meanwhile, address generator 4 is reading a copy of data from the first sector area of memory 2 onto the system bus 8. When the access point reaches the end of the first sector area of memory 2, a carry pulse CA-5 is generated, causing the flag 22 of address generator 4 to switch to ZERO. Since the AND gate 23 of address generator 4 is enabled, the carry pulse CA-5 is passed to the enable input of the higher-bit counter 21 of address generator 4, so that the latter is incremented to ONE to specify the second sector area of memory 2.

During time interval $T_4$, memories 1 and 2 operate in read and write modes, respectively, and controller 12 reads a copy of data from the fourth sector of disk. With the higher-bit address of counter 21 of address generator 3 being ONE, a copy of data is read out of the second sector area of memory 1 onto the system bus 8. On the other hand, data read out of the fourth sector of disk 5 is stored into the second sector area of memory 2.

The above process will be repeated to transfer data as much as required.

If an error is detected in the transferred data, the location of the error is identified by a diagnostic circuit, not shown, and the memory controller 14 is notified of the location of the error. Since the copy of all the transferred data remains in the successive sector areas of the memories 1 and 2, memory controller 14 supplies the program input of an appropriate one of the address generators with an address representing the location of the sector area in which the original of the data in error is stored and resets the read/write control 5 so that the memory of interest is switched to read mode.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. An apparatus for controlling transfer of data between a sectored storage medium and a system bus of a data processor, said apparatus comprising:

first and second memories each being partitioned into a plurality of sectors corresponding to sectors of said storage medium, each sector of said first and second memories being further partitioned into a plurality of memory cells;

first programmable cell counter means for periodically incrementing a first cell address count which specifies memory cells in said first memory beginning with a programmable cell count value preset by said data processor and for generating a first carry output when said first cell address count reaches a prescribed count value which corresponds to a memory cell at an end of a sector of said first memory;

a first flag set in response to a first occurrence of said first carry output and reset in response to a second occurrence of said first carry output;

first programmable sector counter means, responsive to a first input pulse received by said first programmable sector counter means, for incrementing a first sector address count which specifies sectors of said first memory beginning with a programmable sector count value preset by said data processor;

first gate means, responsive to said first flag being set, for applying said second occurrence of said first carry output to said first programmable sector counter means as said first input pulse;

second programmable cell counter means for periodically incrementing a second cell address count which specifies memory cells in said second memory beginning with a programmable cell count value preset by said data processor and for generating a second carry output when said second cell address count reaches a prescribed count value which corresponds to a memory cell at an end of a sector of said second memory;

a second flag set in response to a first occurrence of said second carry output and reset in response to a second occurrence of said second carry output;

second programmable sector counter means, responsive to a second input pulse received by said second programmable sector counter means, for incrementing a second sector address count which specifies sectors of said second memory beginning with a programmable sector count value preset by said data processor;

second gate means, responsive to said second flag being set, for applying said second occurrence of said second carry output to said second programmable sector counter means as said second input pulse; and control means responsive to outputs of said first and second flags, for controlling said first and second memories to alternately operate in read and write modes to cause first data to be written either from said storage medium or from said system bus into a first specified sector of said first memory and to subsequently cause a copy of said first data to be read from said first specified sector of said first memory into either said system bus or said storage medium, and to further cause second data from either said storage medium or said system bus to be written into a second specified sector of said second memory simultaneously with said reading of said first data from said first memory and to subsequently cause a copy of said second data to be read from said second specified sector of said second memory into either said system bus or said storage medium simultaneously with writing of third data into said first memory, said control means responsive to a notification of occurrence of a data error for operating at least one of said first and second memories in a read mode to cause a copy of erroneous data to be selectively recalled from a specific portion of said first memory or said second memory into said system bus, said specific portion specified by said programmable cell count value and said programmable sector count value respectively preset by said data processor into said first programmable cell counter means and said first programmable sector counter means or respectively preset by said data processor into said second programmable cell counter means and said second programmable sector counter means.

* * * * *